Patented Oct. 18, 1949

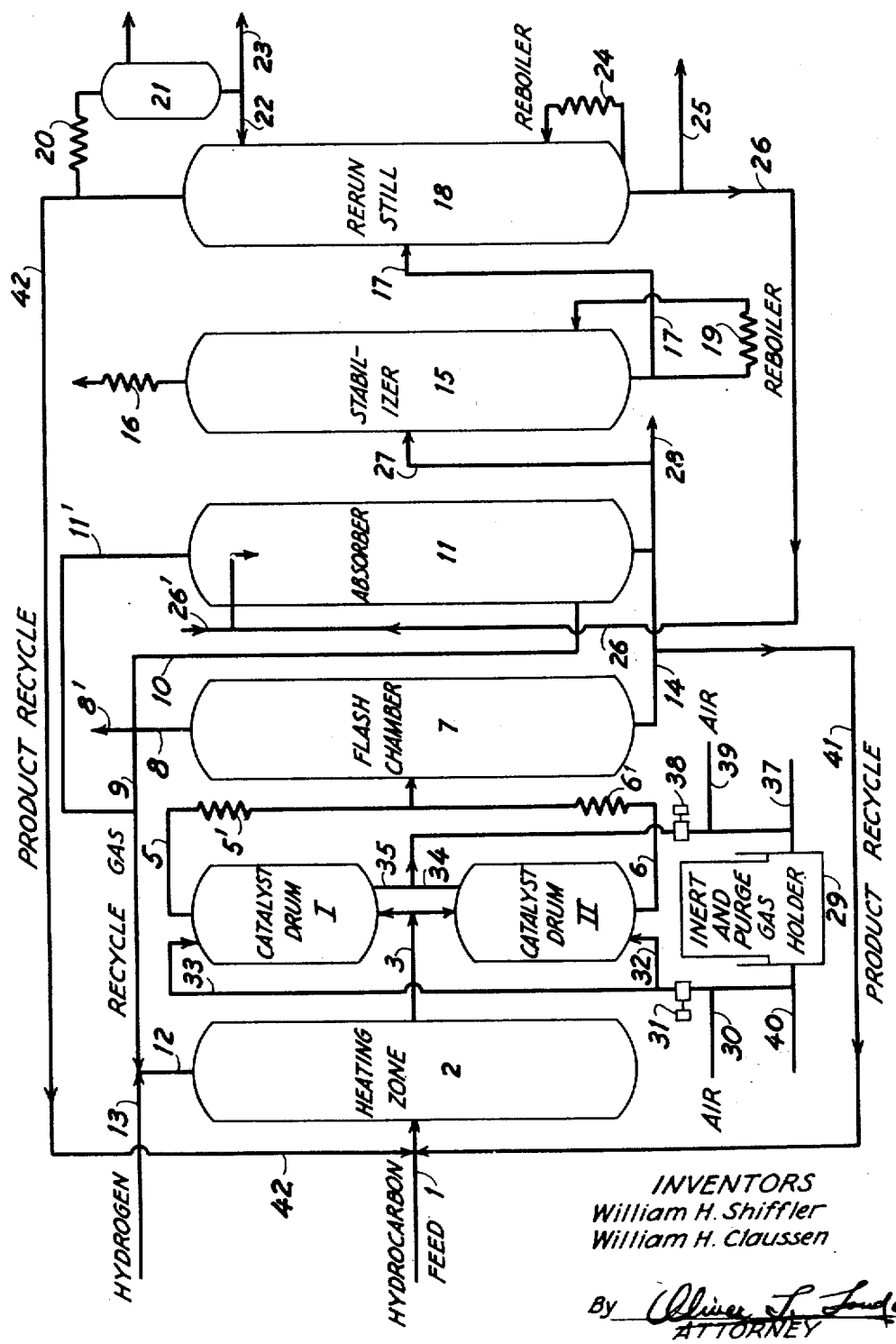

2,485,073

UNITED STATES PATENT OFFICE 2,485,073

HYDROCARBON CONVERSIONS

William H. Shiffler, San Francisco, and William H. Claussen, Berkeley, Calif., assignors to California Research Corporation, San Francisco, Calif., a corporation of Delaware Application February 1, 1946, Serial No. 644,962

16 Claims. (Cl. 196—50)

This invention pertains to the catalytic treatment of individual hydrocarbons or mixtures of several hydrocarbons boiling in the general range of motor fuels whereby the structure and/or composition of a significant portion of the individual molecules is altered in a manner and to an extent to render the treated material better suited to some specific use. More particularly, the invention pertains to a process for the catalytic reforming of relatively light hydrocarbon distillates whereby motor fuels of improved antiknock value are produced and to a catalyst for use in such process.

As is now well known, many gasolines, both straight run and cracked, have, as produced, very low resistance to detonation when burned as fuel in an internal combustion motor having a high compression ratio. Such fuels are accordingly said to have a low "octane number" and are quite unsatisfactory for use in most current automotive engines. Even the best natural and cracked gasolines are usually of too low octane number for most efficient use under the more severe requirements of aviation service.

Many attempts have been made in the past to improve the antiknock value of gasolines generally, by subjecting them to thermal and/or catalytic treatments which have been broadly called "reforming processes." Some real progress has been made but the results are still quite unsatisfactory in several important respects and much yet remains to be accomplished in this field. The ultimate reason for the unsatisfactory progress which has been made is apparently to be found in the fact that substantially all gasolines, both natural and cracked, are mixtures of several types of hydrocarbons, each of which requires a different transformation and a different sort of treatment under different physical conditions in order to enhance its antiknock value. It naturally follows that the more complex the hydrocarbon mixtures submitted to a reforming reaction the more variables there are involved, the more possible combinations there are that give some improvement and the more difficult it is to find that one particular set of conditions that will produce the desired result in the greatest degree and at the least cost.

Such previously proposed catalytic processes are exemplified by British Patent No. 423,001 which discloses for this purpose catalysts which contain sulfides or oxides of the metals of the fifth (exemplified by vanadium sulfide) and/or sixth (exemplified by molybdenum sulfide) group of the periodic system, alone or in admixture with sulfides or oxides of heavy metals of the first and/or eighth group, if desired, with additions of non-reducible oxides, such as zirconium, thorium, or cerium oxide. This patent further discloses that the catalytically active material may be supported by suitable carriers, for example, alumina, active carbon, active silica, and the like, and/or the catalyst mass may be suitably diluted. It further proposes the addition of hydrogen to the feed, but in proportions and at maintained partial pressures of the hydrogen and naphtha feed and under operating conditions generally which radically differ from those contemplated and found highly advantageous pursuant to the present invention.

In general, we have fully substantiated the foregoing theoretical analysis and have found that in order to be practically applied to any actual gasoline or naphtha hydrocarbon mixture, a catalytic reforming process must comprise a large number of nicely balanced compromises effected by minutely controlling an unusually large number of significant variables. The prior disclosures of catalytic reforming process have substantially missed this significant point and are hence in broad general terms only and consequently can be expected to give no more than first approximations to the ultimately possible results.

In accordance with the process of the present invention a composite catalyst having hydrogenating, dehydrogenating, cyclicizing and isomerizing powers is applied under conditions carefully determined and controlled so that each of these effects is realized to the desired degree in the treatment of hydrocarbon materials generally boiling in the range of motor fuels or below, and more specifically in the catalytic reforming of motor fuel hydrocarbons for their antiknock improvement.

It is an object of the present invention to provide a catalyst and a method of operation therewith whereby individual hydrocarbons or mixtures of hydrocarbons may be processed and paraffins, olefins and naphthenes may be dehydrogenated and paraffins and olefins may be cyclized and aromatized.

It is a more specific object of the present invention to provide a catalyst and a method of operation therewith whereby the hydrocarbon mixtures which usually constitute straight run and cracked petroleum hydrocarbon motor fuels may be materially improved in antiknock value with a minimum of cost and a minimum loss of material.

It is another specific object of the present invention to provide a catalyst and a method of operation therewith wherein a relatively large number of substantially independent variables are delicately balanced and coordinated to give a process for reforming any usual mixture of motor fuel hydrocarbons to substantially improve the octane number thereof without excessive losses to gas and coke.

It is another specific object of the present invention to provide a process and a method of operation whereby motor fuel hydrocarbon mixtures that are relatively rich in sulfur compounds may be desulfurized, rendered gum and color stable, and substantially improved in antiknock value in a single operation.

It is a still more specific object of this invention to provide a catalytic process in which narrow boiling fractions of petroleum or other hydrocarbons containing paraffins or naphthenes or both may be substantially converted to aromatics.

It is another more specific object of this invention to provide a catalytic process in which paraffin hydrocarbons, when alone or in admixture with other hydrocarbons, may be efficiently converted to olefins.

Other objects of the invention will be apparent from the following description and the appended claims.

Compounds of the element vanadium have been disclosed as catalysts, either per se or when mounted on suitable supports, for a wide variety of chemical reactions, including various hydrocarbon rearrangements. These disclosures, and especially those pertaining to the more complicated hydrocarbon reactions, such as the reforming reaction, have, however, as above indicated, been of a very superficial nature, frequently devoid of any mention of critically significant variables, having confined their teaching to a broad general discussion of the usual temperature, pressure and time relations. While a result may be obtained by following such incomplete teachings, it has been found that such result is so uncertain in kind and extent and of such doubtful economy as to be of little real practical value to industry. In the process of the present invention not only are the previously disclosed variables limited to practically operable ranges but they are minutely coordinated with each other and with several apparently hitherto unsuspected variables that we have found to be highly significant in the catalysis of hydrocarbon reactions by a vandium containing catalyst and particularly in the reforming reaction. This process may thus be applied with desirable and reliable results to the dehydrogenation of paraffins to olefins and naphthenes to aromatics, to the substantial antiknock improvement of low octane number motor fuels, to the production of aromatic rich liquids from narrow fractions of nonaromatic petroleums and to other desirable hydrocarbon reactions.

The catalysts of the present invention consist initially of vanadium oxide deposited on an alumina support or carrier. The vanadium oxide, however, apparently does not remain long as such but quickly comes to an equilibrium with the hydrocarbon reactants through partial reduction and through partial conversion to the sulfide by reaction with sulfur compounds naturally contained in the hydrocarbon material undergoing treatment or added for that purpose, as will be more fully described hereinafter.

In the catalytic reforming of substantially sulfur-free gasolines and naphthas, it has been found that a modest improvement in octane number may be obtained with the vanadium oxide on alumina catalyst by passing the hydrocarbon in vapor phase over it at about 1000° F. at atmospheric or moderately elevated pressure and at a moderate space velocity of, for instance, 0.25 liquid volume per volume of catalyst per hour without further precautions. A California straight run gasoline having an octane number of 63 when reformed under these conditions has been found to give a product of 76-77 octane number with a yield of about 90%. Likewise, when a paraffin hydrocarbon, such as normal butane, was passed over a vanadium oxide on alumina catalyst at about 1080° F., atmospheric pressure and a flow rate of about 2400 volumes per volume of catalyst per hour, it was found to be dehydrogenated to butene to the extent of about 22% with a loss of about 0.06% to coke.

When, however, opportunity was provided for the vanadium containing catalyst to come to equilibrium with a sulfur yielding compound under the conditions of the foregoing reactions, its activity was found to be very materially increased. For instance, when the same 63 octane number straight run gasoline was treated under the same conditions, except that a substanaial quantity of hydrogen sulfide was added to the charge, the octane number of the product was found to be about 85 instead of 76-77 as before. When the catalyst in the above butane dehydrogenation experiment was permitted to come to equilibrium with a gas containing 3% by volume of hydrogen sulfide, the yield of butene was found to be 28 to 30% instead of the 22% produced in the absence of sulfur.

In our further study of the effect of sulfur on the vanadium oxide on alumina catalysts in various hydrocarbon reactions, we have found that in order to maintain the catalyst at substantially its peak of activity an amount of sulfur equal to about 1% by weight of the hydrocarbon charged is necessary and that this sulfur may be supplied in the form of hydrogen sulfide, carbon disulfide, a high sulfur hydrocarbon compound, such as is sometimes recovered from the so-called acid oil produced in the sulfuric acid refining of high sulfur cracked naphthas, or as the sulfur compounds naturally occurring or produced in the cracking of sulfur bearing petroleum fractions such as those from Mexico and California. When operation is commenced with a freshly prepared or regenerated catalyst, substantially all of the sulfur contained in the charge is taken up by the catalyst. After the vanadium in the catalyst has taken up its equilibrium amount of sulfur under the conditions of operation, additional sulfur entering with the charge will apear in the products of reaction as hydrogen sulfide. If after this sulfur equilibrium has been established a sulfur-free feed is charged, the catalyst will begin to show a substantial loss in activity. While it is somewhat difficut to determine the exact amount of sulfur that is necessary in the charge in order to maintain the sulfur content and the consequent activity of the catalyst under all conditions, it has been definitely established that for hydrocarbon reactions that are effected at between about 900° and 1200° F. the activity is reasonably maintained whenever the feed contains in the neighborhood of 1.0% sulfur by weight whereas it never reaches its maximum when stocks of lower sulfur content are employed unless, of course, it is initially built up by treatment with hydrogen sulfide or a high sulfur charge in which event it would, as above indicated, be rapidly lost just as soon as the partial pressure of sulfur in the reaction zone was permitted to drop below the equilibrium value represented by about 1% by weight of the hydrocarbon reactants. While it would, of course, be possible to maintain a fairly high average activity by alternating between high and low sulfur containing charges, it will usually be found far more convenient to employ a constant charge containing the required amount of sulfur.

The actual sulfur content of the catalyst at any given time will, of course, depend upon a considerable number of variables such as the temperature of operation, the effective partial pressure of the sulfur component of the charge and whether or not equilibrium has been substantially established. Catalysts that we have used within the limits of operating conditions herein outlined have shown on analysis an atomic ratio of vanadium to sulfur between about 14 to 1 and 2 to 1 with the general catalyst activity being somewhat greater in the range of lower ratios.

The vanadium containing catalysts of the present invention may be prepared in a more or less conventional manner by immersing an alumina support in a solution of an appropriate vanadium compound, such as ammonium meta-vanadate, vanadyl sulfate, vanadyl chloride and the like, removing excess solution and decomposing the vanadium salt to the oxide by calcining in air at a temperature between about 900° and 1100° F. It has been found that as the quantity of vanadium deposited on the support is increased from a few tenths of a per cent to about one per cent the activity of the catalyst increases rapidly, while in the range from about 1% to even as high as 10 to 15% of vanadium the catalyst activity remains substantially constant. It has thus been found that in order to be of practical activity the catalysts must contain at least 0.5% of vanadium, expressed as metal, and preferably about 1.0%.

Preferred supports for the vanadium containing catalysts of the present invention consist essentially of alumina, either natural of synthetic, in granular or other appropriate form and of convenient size. Ordinarily the alumina occurring in nature or as usually precipitated may be substantially improved for use in supporting a vanadium catalyst by subjecting it to an appropriate activation treatment such as by careful dehydration at low temperature, by controlled precipitation or by other known means for the production of the "activated alumina" of high adsorptive power. We have found that the "activated alumina" sold by the Aluminum Company of America with the designation "Grade A" is particularly well suited to the production of vanadium catalysts of a high degree of activity. Another and considerably less expensive form of activated alumina which we have used with considerable success is sold under the trade name "Xyte" for use in the decoloration of lubricating oil. Alumina in which is incorporated an appropriate proportion of an activating and stabilizing oxide or compound of another more or less catalytically inert metal, usually by coprecipitation, has also been found highly satisfactory as a support for the vanadium catalysts of the present invention.

While, as already indicated, the process of the present invention is of considerably broader applicability, it will be further explained and illustrated by particular reference to the reforming of a hydrocarbon distillate boiling in the general range of gasoline for the improvement or "upgrading" of its antiknock value. We have found that in order to secure a maximum of antiknock improvement with a minimum of loss to gas and coke and a minimum of operating difficulties, it is desirable to provide a vehicle and/or diluent for the hydrocarbon material being treated. We have further found that if a certain minimum proportion of hydrogen is contained in this vehicle, the results are still further improved. While various gases and particularly hydrocarbon gases, such as natural gas, oil gas, water gas or the lighter portion of the gas produced during the cracking of a petroleum oil, may be employed with good results, it has been found that since some gas is invariably produced in the described reforming process and since such gas will usually contain an appreciable proportion of hydrogen, it may be very conveniently recycled to the reaction zone and employed as the diluent vehicle therein.

In the reforming of a wide variety of natural and cracked gasolines and naphthas with the vanadium-on-alumina catalyst of the present invention, we have found that the degree of dilution and carrier action necessary for best results is provided by recycling gas produced during the reforming reaction to the extent of from about 2,000 to 12,000 cubic feet, measured under standard conditions of temperature and pressure, per barrel of naphtha charged. Depending to a small extent upon the molecular weight of the naphtha, this quantity of recycle gas will provide a reaction mixture containing from about 2 to 14 diluent molecules for each reactant naphtha molecule. Higher ratios, of course, may be employed but without substantial improvement in results, while lower ratios are distinctly undesirable since at dilutions below two to one the proportion of naphtha lost to coke and gas increases very rapidly.

In addition to the ratio of diluting gas to naphtha, we have found that the proportion of hydrogen in the diluting gas at any given total pressure or more broadly, its partial pressure in the reaction mixture is extremely significant to the satisfactory reforming of a naphtha or gasoline by means of the vanadium oxide-sulfide catalysts hereinabove described. The effect of a substantial partial pressure of hydrogen is to lower the loss of charge to coke and consequently to increase the period of operation between catalyst regeneration treatments for the removal of coke deposited thereon. The major part of this benefit is realized between about two and twenty atmospheres (30 and 300 pounds per square inch) partial pressure of hydrogen and under most circumstances between three and ten atmospheres (45 and 150 pounds per square inch).

While the total pressure, as such, on the system does not appear to be especially critical, it will be seen, from what has already been said, to be more or less fixed by the limits of dilution and hydrogen partial pressure to the range between about 50 and 500 pounds per square inch and usually between about 100 and 400 pounds.

With hydrogen rich stocks such as straight run gasolines and naphthas containing appreciable quantities of naphthenic ring compounds, it has been found that the gas produced in the reforming reaction is sufficiently rich in hydrogen that when it is recycled at a rate to give the desired dilution of the reacting molecules, as for example at the rate of 6,000 cubic feet per barrel of naphtha giving a dilution of about seven molecules to one, and at a convenient total pressure of 100 to 400 pounds per square inch, the partial pressure of hydrogen will be within the range necessary for low carbon production and efficient catalyst operation. When, however, stocks that are poorer in hydrogen such as thermally cracked or reformed naphthas are charged, the gas produced in the process contains much less hydrogen. Such gas may be enriched in order to provide the necessary hydrogen partial pressure for successful operation. This may be done by scrubbing the gas with an adsorber oil for the removal of a portion of the hydrocarbons, by thermally or catalytically decomposing the hydrocarbon constituents or by the direct addition of hydrogen, as may be preferred. The partial pressure of hydrogen necessary for a satisfactory operation may also be provided by increasing the total pressure of the recycle gas.

Still another relation, in the reforming reaction with a supported vanadium oxide type catalyst, which it may sometimes be found desirable to regulate is the ratio of the number of hydrogen to naphtha molecules. This obviously may be done by changing the hydrogen content of the recycled gas, as above described. However, when the hydrogen to naphtha ratio is regulated in this way the total pressure on the system must also be changed when it is desired to keep the hydrogen partial pressure constant. A frequently more satisfactory method of effecting the desired regulation of hydrogen to naphtha ratio is by changing the quantity of gas recycled per unit of charge within the limits above mentioned.

With the temperature, total pressure, hydrogen partial pressure and degree of dilution regulated substantially as described, the maximum economy of the reforming reaction as measured by the degree of antiknock improvement effected, increase in octane number, and the yield is largely determined by the time factor or duration of the reaction. It has been found that within the practical temperature range of 900 to 1100° F. mentioned above and with the contemplated variations in the nature of the gasoline or naphtha stock reformed, the contact time for most efficient upgrading of the fuel will lie between about one and seven hundred fifty seconds, calculated on the basis of the empty catalyst chamber. When the element of plant economy in terms of naphtha throughput per day is also included in the consideration, this range is considerably narrowed. For instance, we have found that at an intermediate temperature of 1000° F., pressure of 200 pounds per square inch and dilution or recycled gas rate of 6,000 cubic feet per barrel, a feed rate of between about 0.1 and 2.0 volumes of liquid per volume of catalyst per hour will give a maximum yield of maximum octane number product with a practical rate of plant operation from substantially any stock, either straight run or cracked, that will likely be encountered in commercial operation. The range of stocks studied and for which the conditions herein disclosed are suitable lies between a hydrogen-to-carbon atomic ratio of about 1.70 and 2.10.

While we have found that much can be accomplished toward controlling the quantity of carbon deposited on the catalyst, and hence the active life of the catalyst through control of the several variables discussed above, some deposition of carbon appears to be practically inevitable under any combination of conditions giving a worthwhile antiknock improvement. Not only is the activity of a vanadium-on-alumina catalyst decreased by the deposition of carbon thereon, but the reaction also appears to change in kind as the proportion of carbon increases so that in addition to the economical length of on-stream periods between regenerations, the kind of product produced at different stages of the catalyst life must also be considered in arriving at the most desirable operation-regeneration cycle. We have found that an on-stream period of from about 0.3 to 6.0 hours substantially includes the practical range of operation with the optimum period for most stocks, under the regulated conditions already discussed, being about one hour. Since, of course, the amount of carbon deposited per hour of operation will depend to a very considerable extent upon the severity of the molecular transformation effected, the ultimate control of the on-stream period will usually be in terms of the quantity of carbon deposited rather than the time. As an upper limit we have found it impractical to continue to operate with a catalyst upon which more than 15% by weight of carbon has been deposited and that it is seldom desirable to continue operation beyond the point at which the deposit of carbon on the catalyst reaches about 5 to 6%, in other words the preferred range of operation lies below half the maximum permissible carbon deposit.

Conventional methods have been found suitable for regeneration of the vanadium-on-alumina catalysts employed in the process of the present invention. When the catalyst vessel is provided with adequate cooling means to carry off or utilize the liberated heat, the catalyst may be blown directly with air or other convenient oxygen containing gas mixture. When no special provision is made in the construction of the catalyst vessel for the rapid elimination of heat, the coke or carbonaceous material which is deposited on the catalyst during operation may be burned off in a current of gas containing a proportion of oxygen which is so regulated that the heat liberated by the combustion will be carried away by the gas stream without raising the temperature of the catalyst above about 1200° F. If the temperature is rigorously prevented from surpassing this value, the catalyst may be returned to its original activity an indefinite number of times whereas if the temperature is permitted to substantially exceed 1200° F. for even short periods of time a material permanent loss in catalyst activity is usually experienced.

In preparing a gasoline or naphtha stock for reforming according to the process of the present invention, it is desirable to remove all $C_5$ and lighter compounds and usually also the normal and isohexanes by fractional distillation, thus leaving only the cyclic C₆ and heavier compounds for processing since for most part they are susceptible of greater antiknock improvement than are the hydrocarbons of lower molecular weight. It is likewise usually desirable to limit the end boiling point of the naphtha charge to about 450° F. since higher boiling fractions are found to deposit an excessive amount of coke.

While the practical temperature for the reforming reaction has been found to be included substantially within the range from about 900° to 1100° F. with the other conditions of operation regulated as described, it will readily be appreciated that for the relatively simpler reactions of the present invention such as the dehydrogenation of a normally gaseous paraffin a somewhat higher maximum temperature may be employed as for instance up to 1200° F. or in extreme cases even higher.

The process of this invention will now be explained with reference to the figure of the attached drawing. Since only conventional apparatus is employed in the process, the drawing is entirely diagrammatic and only the most significant valves, lines, etc. are shown.

Two catalyst drums, I and II, are shown so connected that while one is on-stream the catalyst in the other may be in process of regeneration. The dehexanized naphtha or other hydrocarbon feed to be processed is charged through line 1 to a heating zone 2, which includes connections through line 12 for the addition of recycle gas from line 9, recycle product from lines 41 and/or 42 and auxiliary hydrogen, if desired, from line 13. The heated charge and diluent gas is passed through line 3 to catalyst drum I where the catalyst in drum II is being regenerated, and after passing through the catalyst the reaction mixture is conducted by line 5 through cooler 5' to a flash chamber 7 wherein the lighter gases, hydrogen, methane, etc. are separated and passed through line 8 to the recycle system presently to be described. The liquid product from 7 is passed by line 14 to stabilizer 15 wherein a propane-butane fraction may be separated and removed through an appropriate reflux unit 16 while the stabilized product is passed through line 17 to a rerun still 18 for final fractionation. Stabilizer 15 and rerun still 18 may be conveniently fitted with reboilers 19 and 24, respectively.

The stabilized and fractionated product from still 18 is passed overhead through condenser 20 to receiving and separating drum 21 from which a portion may be returned as reflux liquid through line 22 while the remainder is removed from the system through line 23. Bottoms from the rerun still 18 may be removed from the system through line 25 or sent forward through line 26 for use in the recycle gas enrichment system.

In order to add heat capacity to the charge entering the catalyst zones, it is sometimes found desirable to recycle a portion of the naphtha product from line 14 through line 41, or from the overhead from still 18 through line 42, to feed line 1 and heating zone 2. Such operation makes possible a more uniform temperature in the reaction zone and in special cases will be found desirable in other respects. For instance, in the extreme processing of a narrow petroleum fraction for the production of toluene it may be especially desirable to recycle a portion or all of the liquid product for further reaction over the catalyst.

The hydrogen and light hydrocarbon mixture removed from the flash chamber 7 through line 8 may be discharged from the system at 8', recycled through lines 9 and 12 to the heating zone 2 or sent through line 10 to an absorber 11 wherein the proportion of hydrogen is increased by scrubbing out a part of the hydrocarbon components with the rerun still bottoms entering from line 26 or with other appropriate liquid hydrocarbon added at 26', as may be desired. The thus treated gas may then be sent through lines 11', 9 and 12 for admixture with the fresh naphtha feed in heating zone 2 as previously indicated. The absorber liquid from 11 may be run to stabilizer 15 through line 27 or may be discharged from the system at 28.

While the catalyst in drum I is on-stream as above described, the catalyst in drum II is in process of regeneration. The drum is first swept clear of residual hydrocarbon gas and vapors by means of an inert purge gas from gas holder 29 which may be circulated by means of pump 31 through line 32 to the catalyst chamber and discharged through lines 34, 36 and 37. Air is then taken in through line 30 by means of pump 31 and inert gas is added from gas holder 29 to give a mixture containing the desired amount of oxygen. This gas mixture is then passed through line 32 to the catalyst drum and removed by means of lines 34 and 36 for return to the gas holder or discharge to the air through line 37. It will usually be found desirable to connect the catalyst drums so that the direction of gas flow may be reversed during the regeneration treatment. The connections are so shown in the drawing but need not be reviewed in detail.

The following examples will serve further to illustrate the process of the present invention and to emphasize the importance of the several variables whose control and coordination is taught.

*Example 1.*—A cracked naphtha from a high sulfur California crude was reformed over a vanadium oxide-on-alumina catalyst. The significant data are as follows:

Naphtha gravity, degrees, A. P. I. -------- 47.0
Naphtha percent sulfur ------------------ 2.2
Naphtha molecular weight -------------- 123.0
Naphtha boiling range ------------°F__ 220–415
Naphtha octane number (motor method)__ 67.0
Operating temperature --------------°F__ 1000
Operating pressure lbs./sq. in.------------- 200
Operating on-stream period, hrs. --------- 1.0
Operating feed rate, vol. liq./vol. cat./hr.__ 0.8
Operating recycle gas rate cu. ft./bbl.----- 6000
Operating hydrogen partial press., lbs./sq. in. 64
Product yield, vol. percent---------------- 83
Product octane number (M. M.) ---------- 81
Product percent sulfur ------------------ 0.11
Loss percent charge to coke ------------- 3.5

*Example 2.*—A substantially sulfur free straight run California naphtha having an A. P. I. gravity of 56.9°, an octane number of 63.1 and an average molecular weight of 101 was reformed with and without addition of hydrogen sulfide other conditions being the same. Operating conditions and results were as follows:

|  | 1 | 2 |
|---|---|---|
| Catalyst temperature----------------------°F__ | 1,000 | 1,000 |
| Reaction pressure lbs./sq. in.---------------- | 200 | 200 |
| Feed rate vol. liq./vol. cat./hr.-------------- | 0.25 | 0.25 |
| On-stream period hrs.----------------------- | 6.0 | 6.0 |
| Recycle gas rate cu. ft./bbl.----------------- | 6,000 | 6,000 |
| Hydrogen partial press. lbs./sq. in.---------- | 98 | 102 |
| Hydrogen sulfide partial press. lbs./sq. in.--- | 0 | 7.7 |
| Product yield, vol. per cent------------------ | 89 | 79 |
| Product octane number (M. M.)-------------- | 77 | 85 |
| Loss, per cent charge to coke---------------- | 0.3 | 1.4 |

*Example 3.*—A mixture of low sulfur straight run and high sulfur cracked gasolines was made to give a product containing sufficient sulfur to maintain the catalyst activity and having a sufficiently high hydrogen-to-carbon ratio that the gas produced during the reforming recycling without further adjustment. Data obtained when reforming this stock were as follows:

| | |
|---|---|
| Operating temperature, °F | 1000 |
| Total pressure, lbs./sq. in | 200 |
| Feed rate, vol. liq./vol. cat./hr | 0.5 |
| On-stream, hrs | 6.0 |
| Recycle gas, cu. ft./bbl. chg | 6000 |
| Hydrogen partial press., lb./sq. in | 88 |
| Liquid yield, vol. per cent | 88 |
| Octane number (M. M.) | 79 |
| Charge to coke, wt. per cent | 1.3 |
| Coke on catalyst, wt. per cent (end of cycle) | 3.3 |

*Example 4.*—A narrow boiling (200–240° F.) fraction from Kettleman Hills, California, crude petroleum was subjected to reforming conditions for the purpose of producing toluene and other aromatic hydrocarbons. Sufficient hydrogen sulfide was added so that at the beginning of the run its partial pressure was about 10 pounds per square inch. This value decreased to about 2 pounds by the end of the run. The following table shows the conditions employed and the results obtained:

| | |
|---|---|
| Operating temperature, °F | 1030 |
| Total pressure, lbs./sq. in | 200 |
| Feed rate, vol. liq./vol. cat./hr | 0.25 |
| On-stream period, hrs | 6.0 |
| Recycle gas, cu. ft./bbl. chg | 6000 |
| Hydrogen partial pressure, lbs./sq. in | 73 |
| Liquid yield, vol. per cent | 65 |
| Total aromatics in liquid, vol. per cent | 75 |
| Toluene in liquid, vol. per cent | 38 |
| Toluene yield from charge, vol. per cent | 25 |

*Example 5.*—A California straight run naphtha similar to that used in Example 2, but to which carbon bisulfide was added to give about 2% sulfur, was reformed to produce an aviation gasoline. The operating conditions and the data obtained were as follows:

| | |
|---|---|
| Operating temperature, °F | 1000 |
| Total pressure, lbs./sq. in | 200 |
| Feed rate, vol. liq./vol. cat./hr | 0.4 |
| On-stream period, hrs | 6.0 |
| Recycle gas, cu. ft./bbl. chg | 6000 |
| Hydrogen partial pressure, lbs./sq. in | 79 |
| Liquid yield, vol. per cent | 74 |
| Octane number, CFR motor method | 86 |
| Charge to coke, wt. per cent | 2.6 |
| Aviation gasoline content of liquid, vol. per cent (275° F. at 90% distilled) | 91 |
| Octane number of aviation gasoline | 85 |

The foregoing examples are similar to those set forth in our copending application Serial No. 342,804, filed June 27, 1940, subsequently abandoned in favor of the present application, and hence to the extent of this common subject matter, the instant application constitutes a substitute or continuation thereof.

Pursuant to the following examples not set forth in said application Serial No. 342,804, the process of the invention is practiced employing in place of the previously described vanadia-alumina composition as the initially introduced catalytic material, a composition including alumina and an oxide of molybdenum. Both the oxide and sulfide of vanadium and molybdenum are effective catalytic materials for the dehydrogenation of non-aromatic hydrocarbons to aromatics, and these compounds function similarly in the process concerned in that sulfur present in the charge combines chemically with the particular oxide selected from the group consisting of the oxides of vanadium and molybdenum.

In the following example the catalyst as introduced into the dehydrogenation reactor consisted of a silico-molybdate on active alumina composition prepared as described hereafter. The hydrocarbon feed to the reaction zone consisted of a mixture of a straight run substantially sulfur-free (.009% sulfur) refined light naphtha fraction derived from Kettleman crude, with 10% of carbon disulfide. The inspections of the light naphtha fraction are given in the following Table I.

The feed was passed over the catalyst mass for a total period of thirty-six hours during which different operating conditions were maintained during three consecutive stages designated in Table I as A, B, and C, and products collected, segregated, and examined to determine the effect of the varied conditions in each stage. A superatmospheric pressure of 400 lbs. was maintained and hydrogen was added to the charge throughout the contacting period in amounts ranging from 6–2 to 1 mol ratio of hydrogen to naphtha, it having been previously observed in prior experiments that the activity of the catalyst was substantially prolonged and the duration of the "on-stream" operation over a commercially practical period of time increased thereby. The desired conversion to aromatic hydrocarbons increased, other conditions being equal, with temperature, the maximum production of aromatics 28% being obtained at 900° F. (stage C), whereas 25% aromatics were produced during the 875° F. contacting (stage B) and 17% aromatics during the 825° F. (stage A), although in each of the subsequent higher temperature stages previously contacted and hence less active catalyst was employed.

In the following table, the operating conditions maintained in the successive stages, A, B, and C, and inspections of the feed and liquid products are shown.

*Table I*

| | | A | B | C |
|---|---|---|---|---|
| Operating Conditions: | | | | |
| Temperature, °F | | 825 | 875 | 900 |
| Pressure, lbs./sq. in | | 400 | 400 | 400 |
| Space Velocity, V./V./hr | | 0.167 | 0.5 | 0.5 |
| On-stream time, hours | | 14 | 12 | 10 |
| Hydrogen added—mol ratio H₂/naphtha | | 6 | 2 | 2 |

| | Feed | A | B | C |
|---|---|---|---|---|
| Yield: Liquid, Vol. Per Cent | 100 | 88 | 87 | 82 |
| Liquid Inspections: | | | | |
| Gravity, °API | 57.3 | 52.7 | 52 | 54.2 |
| Aniline Point, °F | 118 | 99 | 83.5 | 77 |
| Acid Wash Aniline Point, °F | 130 | 136 | 138 | 139 |
| Composition (approx.)— | | | | |
| Per Cent Paraffins | 38 | 42 | 41 | 42 |
| Naphthenes | 56 | 40 | 33 | 29 |
| Olefins | 0 | 1 | 1 | 1 |
| Aromatics | 6 | 17 | 25 | 28 |
| Distillation—A. S. T. M.— | | | | |
| Start | 195 | | 174 | 156 |
| 10 | 210 | | 208 | 205 |
| 20 | 214 | | 215 | 214 |
| 50 | 229 | | 231 | 231 |
| 70 | 240 | | 247 | 244 |
| 90 | 258 | | 274 | 270 |
| End Point | 295 | | 333 | 341 |

The catalyst employed in the foregoing example was prepared by mixing powdered silico-regenerated catalyst under the conditions set forth under run II in Table II.

Table II

|  | Run I |  |  | Run II |
|---|---|---|---|---|
|  | A | B | C |  |
| Operating Conditions: |  |  |  |  |
| Temperature, °F | 825 | 1,000 | 1,000 | 1,000 |
| Pressure, lb./sq. in | 400 | 400 | 400 | 400 |
| Space Velocity, V./V./hr | 0.25 | 1.00 | 0.50 | 1.00 |
| On-stream Time, Hr | 6 | 8 | 8 | 12 |
| Mol Ratio Added $H_2$ ($H_2$/naphtha) | 6 | 6 | 6 | 6 |
| Regeneration Conditions: | Not regenerated |  |  |  |
| Pressure, P. S. I. G |  |  | 0 | 0 |
| Rate, cu. ft./hr |  |  | 5 | 5 |
| Oxygen Content, Vol. Per Cent |  |  | 2 | 2 |
| Time, Hr |  |  | 12 | 8 |
| Yields: |  |  |  |  |
| Liquid— |  |  |  |  |
| Vol. Per Cent | 88.4 | 79.5 | 81.1 | 80.8 |
| Wt. Per Cent | 90.9 | 81.3 | 82.4 | 82.3 |
| Coke— |  |  |  |  |
| Wt. Per Cent (est.) | 0.3 | 1.5 | 1.1 | 1.1 |
| Wt. Per Cent of Catalyst End of Cycle (calc.) | 0.38 | 10.6 | 14.4 | 11.3 |

|  | Feed | A | B | C | Run II |
|---|---|---|---|---|---|
| Liquid Inspections: |  |  |  |  |  |
| Gravity, °API | 53.0 | 49.9 | 49.0 | 50.4 | 49.5 |
| Aniline Point, °F | 121 | 96 | 41 | 53 | 55 |
| Acid Wash Aniline Point, °F | 135.5 | 131 | 132 | 133 | 126 |
| Bromine Number | 0 | 2 | 13 | 9 | 18 |
| Composition (approx.)— |  |  |  |  |  |
| Per Cent Paraffins | 26 | 22 | 18 | 22 | 28 |
| Naphthenes | 68 | 60 | 35 | 37 | 41 |
| Olefins | 0 | 1 | 8 | 6 | 12 |
| Aromatics | 6 | 17 | 39 | 35 | 29 |
| Octane No. CFRMM | 56.9 |  | 79.6 |  | 78.1 |
| ASTM D-86— |  |  |  |  |  |
| Start | 128 | 128 | 98 | 97 | 96 |
| 10 | 188 | 198 | 154 | 150 | 153 |
| 20 | 222 | 223 | 183 | 180 | 185 |
| 30 | 286 | 284 | 254 | 247 | 253 |
| 50 | 325 | 327 | 301 | 296 | 302 |
| 70 | 385 | 384 | 371 | 364 | 371 |
| 90 | 442 | 431 | 462 | 453 | 452 |
| End Point |  |  |  |  |  |
| Sulfur, Per Cent | 0.12 | 0.01 | 0.01 | 0.01 | 0.01 | molybdate in a small amount of water to make a thin paste. Activated alumina in granular form (8–14 mesh) was stirred with the paste, and the mixture evaporated to dryness. The used catalyst showed % Si—2.5, % Mo—15.6, % Al—35.2, the major portion of the catalyst being constituted by the activated alumina, and the primary activating component being constituted by the molybdenum or oxide thereof. The silica component constituted a relatively minor amount of the entire catalyst and may be omitted.

In the following example (Table II) a silico-molybdate on active alumina catalyst was likewise employed. In this example the naphtha undergoing reforming consisted of a straight run gasoline fraction from a Kettleman crude having the inspection given in Table II, and was introduced into the catalytic reactor mixed with six per cent of carbon disulfide. The catalyst was maintained on-stream for a period of twenty hours during three distinct stages A, B, and C, during which the operating conditions were varied, and separate collection and inspection of products obtained as set forth in Table II to thereby determine the effect of the variation in conditions in each stage. After completion of the on-stream run I including stages A, B, and C, the catalyst mass was regenerated by combustion of the carbonaceous deposits with air diluted with an inert gas under the operating conditions given in Table II, and run II thereafter completed on the same feed stock over the regenerated catalyst under the conditions set forth under run II in Table II.

In the following example (Table III) a high sulfur cracked naphtha fraction having the inspections set forth in Table III was employed, and carbon disulfide was introduced therewith in the proportions indicated in Table III over a mass of the silico-molybdate on active alumina catalyst. This example of the practice of the invention is of particular interest in illustrating the effect of a high degree of unsaturation, i. e., olefins in the charging stock accompanied by a high sulfur content, that is conditions which characterize generally many cracked naphtha stocks. In this example, operating conditions were varied and separate collection and inspection of the products made during the distinct stages, A, B, C, D, and E, the catalyst mass regenerated after stage E under the conditions indicated in Table III, and the on-stream run continued for two further distinct stages under the conditions noted under A-1 and A-2, Table III.

As is apparent from a comparison of the conditions maintained and results obtained in each of the stages, desulfurization alone may be accomplished with little change in octane number of the naphtha feed, or desulfurization with substantial octane improvement with increasing severity of treatment, that is by increase in temperature or decrease in space velocity, may be produced, however, at some expense of yield of liquid product.

Table III

| | | A | B | C | D | E | A-1 | A-2 |
|---|---|---|---|---|---|---|---|---|
| Operation Conditions: | | | | | | | | |
| Temperature, °F | | 825 | 975 | 975 | 975 | 975 | 825 | 975 |
| Pressure, lb./sq. in | | 400 | 700 | 700 | 700 | 700 | 400 | 700 |
| Space Velocity, V./V./hr | | 0.25 | 1.5 | 1.0 | 0.6 | 0.7 | 0.25 | 0.6 |
| On-stream Time, Hr | | 6 | 16 | 18 | 15 | 84 | 8 | 59 |
| Hydrogen Added, Mol ratio H₂/naphtha | | 6 | 6 | 6 | 6 | 6 | 6 | 6 |
| Per Cent CS₂ Added to Feed | | 6 | 10 | 6 | 4 | 10 | 10 | 10 |
| Regeneration Conditions: | | | | | | | | |
| Pressure, P. S. I. G | | | | | | 0 | | |
| Rate, cu. ft./hr | | | | | | 5 | | |
| Oxygen Content, Vol. Per Cent | | | | | | 2 | | |
| Time, Hr | | | | | | 16 | | |
| Yields: | | | | | | | | |
| Liquid, Vol. Per Cent | | 98 | 84.5 | 82.6 | 77.4 | 81.7 | 88 | 82 |
| Coke— | | | | | | | | |
| Wt. Per Cent (est.) | | | 0.1 | 0.2 | 0.3 | 0.2 | | 0.2 |
| Wt. Per Cent of Catalyst End of Cycle (calc.) | | | 2.36 | 5.88 | 8.53 | 20.0 | | 6.94 |

| | Feed | A | B | C | D | E | A-1 | A-2 |
|---|---|---|---|---|---|---|---|---|
| Liquid Inspections: | | | | | | | | |
| Gravity, °API | 48.7 | 51.3 | 52.0 | 52.7 | 53.5 | 52.9 | 50.4 | 52.4 |
| Aniline Point, °F | 94 | 108.5 | 81 | 90 | 78 | 78.5 | 105 | 80 |
| Acid Wash Aniline Point, °F | 150 | 147 | 141 | 136 | 137 | 134 | 141.5 | 136 |
| Bromine Number | 61.8 | 0.5 | 4.6 | 3.1 | 3.0 | 2.4 | 0.8 | 2.5 |
| Composition (approx.)— | | | | | | | | |
| Per Cent Paraffins | 28 | 44.5 | 34.5 | 32 | 32 | 27 | 44 | 29 |
| Naphthenes | 18 | 38 | 35 | 39 | 39 | 45 | 38 | 43 |
| Olefins | 47 | 0.5 | 3.5 | 2 | 2 | 2 | 1 | 2 |
| Aromatics | 7 | 17 | 27 | 27 | 27 | 26 | 17 | 26 |
| Octane No. CFRMM | 65.6 | | 64.0 | 67.9 | 70.1 | 69.1 | | 68.6 |
| ASTM D-86— | | | | | | | | |
| ST | 236 | | 108 | 100 | 98 | 100 | | 108 |
| 10 | 261 | | 184 | 172 | 166 | 170 | | 176 |
| 20 | 270 | | 215 | 207 | 196 | 202 | | 208 |
| 50 | 293 | | 266 | 259 | 253 | 257 | | 260 |
| 70 | 315 | | 292 | 288 | 284 | 287 | | 280 |
| 90 | 342 | | 338 | 336 | 338 | 333 | | 289 |
| EP | 375 | | 396 | 396 | 396 | 394 | | 333 |
| Sulfur, Wt. Per Cent | 1.11 | 0.05 | 0.01 | 0.02 | 0.02 | 0.02 | 0.11 | 393 0.01 |

Having now described and illustrated a catalyst and process for the catalytic treatment of hydrocarbons which leads, through the careful coordination and control of a number of significant variables, to more reliable and desirable results and results of greater magnitude than have been possible by hitherto disclosed processes for effecting the same reactions, we claim:

1. Process for the catalytic treatment of fluid hydrocarbons which comprises contacting said hydrocarbons in vapor phase with a solid catalyst comprising oxides and sulfides of vanadium which are in substantial equilibrium at a temperature between 900° F. and 1200° F. with a mixture of hydrogen, hydrocarbon and a volatile sulfur containing compound under a total pressure between 50 and 500 pounds per square inch, the partial pressure of hydrogen being between 30 and 300 pounds and of the sulfur compound being between 0.5 and 30 pounds per square inch, the vanadium oxide and sulfide components of the catalyst being supported on activated alumina and present to the extent of at least 0.5% by weight expressed as vanadium metal.

2. Process for the catalytic conversion of hydrocarbons boiling in the motor fuel range which comprises subjecting said hydrocarbons to the action of a vanadium oxide-activated alumina catalyst at a temperature of from about 900° F. to 1100° F., a total pressure of from 100 to 400 pounds per square inch, in the presence of added hydrogen the partial pressure of which is from 30 to 300 pounds per square inch and in the presence of sulfur of such concentration that when equilibrium is reached between the vanadium of the catalyst and the sulfur under the conditions prevailing the atomic ratio of vanadium to sulfur in the catalyst lies within the range of about 14 to about 2, and at a space velocity of about 0.1 to 2 volumes of liquid hydrocarbons per volume of catalyst space per hour.

3. Process for the catalytic reforming of a naphtha containing paraffins and naphthenes to produce aromatics and improve the antiknock value of said naphtha which comprises subjecting said naphtha to the action of a catalyst comprising vanadium oxide and activated alumina at a temperature of from about 900° F. to 1100° F., a total pressure of from 100 to 400 pounds per square inch, in the presence of added hydrogen the partial pressure of which is from 30 to 300 pounds per square inch and in the presence of sulfur of such concentration that when equilibrium is reached between the vanadium of the catalyst and the sulfur under the conditions prevailing the atomic ratio of vanadium to sulfur in the catalyst lies within the range of about 14 to about 2, and at a space velocity of about 0.1 to 2 volumes of liquid hydrocarbons per volume of catalyst space per hour.

4. Process as defined in claim 2 in which the concentration of sulfur in the hydrocarbons subjected to said catalyst is about 1% by weight.

5. Process as defined in claim 2 in which at least 0.5% of said vanadium oxide-activated alumina catalyst is vanadium.

6. Process as defined in claim 2 in which at least 1.0% of said vanadium oxide-activated alumina catalyst is vanadium.

7. Process as defined in claim 2 in which said atomic ratio of vanadium to sulfur in the catalyst lies within the range of about 8 to about 2.

8. Process as defined in claim 3 in which said naphtha is a cracked gasoline.

9. Process as defined in claim 3 in which said catalyst consists essentially of vanadium oxide and activated alumina.

10. Process as defined in claim 3 in which gases from the zone of reaction are recycled therein at a rate within the range of 2000 to 12,000 cubic feet at standard conditions per barrel of liquid naphtha charged to said zone.

11. Process as defined in claim 3 in which the partial pressure of hydrogen is maintained between 45 and 150 pounds per square inch and in which said atomic ratio of vanadium to sulfur in the catalyst lies within the range of about 8 to about 2.

12. Process as defined in claim 3 in which said temperature is maintained from about 1000° F. to about 1050° F. and in which said atomic ratio of vanadium to sulfur in the catalyst lies within the range of about 8 to about 2.

13. Process as defined in claim 3 in which said space velocity is within the range of 1 to 2 and in which said atomic ratio of vanadium to sulfur in the catalyst lies within the range of about 8 to about 2.

14. Process as defined in claim 3 in which the partial pressure of hydrogen sulfide in the zone of reaction is between 0.5 and 30 pounds per square inch.

15. Process as defined in claim 3 in which said hydrocarbons boiling in the motor fuel range comprise hydrocarbons within the range of $C_5$ and heavier to an end boiling point of no greater than 450° F. having $C_5$ and lighter, and normal and isohexanes removed.

16. In a process for producing aromatic hydrocarbons from a mixture of hydrocarbons containing naphthenes and paraffins having boiling points within the boiling point range of gasoline wherein a stream containing said mixture of hydrocarbons is passed in contact with a dehydrogenating and cyclicizing catalyst under conditions adapted to convert said hydrocarbons primarily to aromatic hydrocarbons with incidental production due to side reactions of appreciable but limited quantities of coke and cracked normally gaseous hydrocarbons and the flow of said hydrocarbons continued in contact with the catalyst until the coke deposited thereon has reached an undesirable value, the improvement for enhancing the yield of desired aromatic products which comprises passing a stream of said mixture of hydrocarbons comprising a sulfur-containing cracked naphtha over a catalyst consisting essentially of vanadium oxide and activated alumina, the vanadium content of which is at least 1%, at a temperature from about 900° F. to 1100° F., at a space velocity of about 0.1 to 2 volumes of liquid hydrocarbons per volume of catalyst space per hour, adding free hydrogen to said stream to maintain a partial pressure of free hydrogen from 30 to 300 pounds per square inch whereby a concentration of free hydrogen in substantial excess of that resulting from the conversion alone is maintained in the catalytic contacting zone, maintaining said zone under a pressure of from 100 to 400 pounds per square inch, and maintaining such a concentration of sulfur in said catalytic contacting zone that on equilibrium with said catalyst under the conditions prevailing in said zone the atomic ratio of vanadium to sulfur in the catalyst lies within the range of from about 14 to about 2.

WILLIAM H. SHIFFLER.
WILLIAM H. CLAUSSEN.

REFERENCES CITED

The following references are of record in the file of this patent:

UNITED STATES PATENTS

| Number | Name | Date |
| --- | --- | --- |
| 2,184,235 | Groll et al. | Dec. 19, 1939 |
| 2,253,486 | Belchetz | Aug. 19, 1941 |
| 2,270,715 | Layng et al. | Jan. 20, 1942 |
| 2,288,336 | Welty et al. | June 30, 1942 |
| 2,320,147 | Layng et al. | May 25, 1943 |

FOREIGN PATENTS

| Number | Country | Date |
| --- | --- | --- |
| 423,001 | Great Britain | Apr. 24, 1934 |